US011803050B2

(12) United States Patent
Nie et al.

(10) Patent No.: US 11,803,050 B2
(45) Date of Patent: Oct. 31, 2023

(54) OPTICAL SCANNING DEVICE AND ELECTRONIC IMAGING APPARATUS

(71) Applicant: Zhuhai Pantum Electronics Co., Ltd., Zhuhai (CN)

(72) Inventors: Yongchao Nie, Zhuhai (CN); Chao Wang, Zhuhai (CN)

(73) Assignee: ZHUHAI PANTUM ELECTRONICS CO., LTD., Zhuhai (CN)

(*) Notice: Subject to any disclaimer, the term of this patent is extended or adjusted under 35 U.S.C. 154(b) by 303 days.

(21) Appl. No.: 17/361,211

(22) Filed: Jun. 28, 2021

(65) Prior Publication Data

US 2021/0325665 A1 Oct. 21, 2021

Related U.S. Application Data

(63) Continuation of application No. PCT/CN2019/119387, filed on Nov. 19, 2019.

(30) Foreign Application Priority Data

Dec. 29, 2018 (CN) .......................... 201811633897.6

(51) Int. Cl.
*G02B 26/10* (2006.01)
*G02B 3/04* (2006.01)
*G03G 15/04* (2006.01)

(52) U.S. Cl.
CPC ............ *G02B 26/105* (2013.01); *G02B 3/04* (2013.01); *G03G 15/04036* (2013.01)

(58) Field of Classification Search
None
See application file for complete search history.

(56) References Cited

U.S. PATENT DOCUMENTS

| 6,927,883 | B1* | 8/2005 | Fujimoto | ............. | G02B 26/125 |
|  |  |  |  |  | 358/484 |
| 2010/0091351 | A1* | 4/2010 | Teramura | ............. | G02B 26/127 |
|  |  |  |  |  | 359/205.1 |
| 2016/0291500 | A1 | 10/2016 | Taki |  |  |

FOREIGN PATENT DOCUMENTS

| CN | 1335528 A | 2/2002 |
| CN | 1474211 A | 2/2004 |

(Continued)

OTHER PUBLICATIONS

The World Intellectual Property Organization (WIPO) International Search Report With Translation and Written Opinion for PCT/CN2019/119387 dated Jan. 23, 2020 6 Pages (including translation).

(Continued)

*Primary Examiner* — Roy Y Yi
(74) *Attorney, Agent, or Firm* — ANOVA LAW GROUP, PLLC

(57) ABSTRACT

An optical scanning device and an electronic imaging apparatus are provided. The optical scanning device includes a light source, a first optical unit, an optical deflector, and an imaging optical system for guiding a light beam deflected by the optical deflector to a scanned surface for imaging. The imaging optical system includes an F-θ lens satisfying fc/fs≤0.6, X1−X1c>0, and X2−X2c>0, where fs is a focal length of the F-θ lens, fc is an fθ coefficient of the F-θ lens; X1 is a distance between a projection of one incident point on the main optical axis and the scanning origin, X2 is a distance between a projection of one exit point on the main optical axis and the scanning origin, X1c is a distance between the central incident point and the scanning origin, and X2c is a distance between the central exit point and the scanning origin.

10 Claims, 4 Drawing Sheets

(56) References Cited

FOREIGN PATENT DOCUMENTS

| | | |
|---|---|---|
| CN | 1647356 A | 7/2005 |
| CN | 1869761 A | 11/2006 |
| CN | 1979249 A | 6/2007 |
| CN | 101178478 A | 5/2008 |
| CN | 101241229 A | 8/2008 |
| CN | 101251646 A | 8/2008 |
| CN | 101339294 A | 1/2009 |
| CN | 102298209 A | 12/2011 |
| CN | 103293670 A | 9/2013 |
| CN | 104345451 A | 2/2015 |
| CN | 106886091 A | 6/2017 |
| CN | 106896669 A | 6/2017 |
| CN | 107783281 A | 3/2018 |
| CN | 207588747 U | 7/2018 |
| CN | 109491077 A | 3/2019 |
| JP | H0943522 A | 2/1997 |
| JP | H09281422 A | 10/1997 |
| JP | 2013076807 A | 4/2013 |

OTHER PUBLICATIONS

Xingang Shi et al. "The design of the f-theta zoom lens with CO2laser marking machines", Laser Journal, vol. 30 No. 4.2009 p. 17-18, Dec. 31, 2009.

Yan Zhou et al. "Optical design of wide-angle multi-wavelength f-theta lens" Journal of Applies Optics, vol. 38 No. 4 p. 534-537, Jul. 31, 2017.

* cited by examiner

OPTICAL SCANNING DEVICE AND ELECTRONIC IMAGING APPARATUS

CROSS-REFERENCES TO RELATED APPLICATION

This application is a continuation of International Application No. PCT/CN2019/119387, filed on Nov. 19, 2019, which claims the priority of Chinese Patent Application No. 201811633897.6, filed on Dec. 29, 2018, the contents of which are incorporated herein by reference in its entirety.

TECHNICAL FIELD

The present disclosure generally relates to the field of optical scanning technology and, more particularly, relates to an optical scanning device and an electronic imaging apparatus.

BACKGROUND

Optical scanning devices are widely used in imaging fields such as printing imaging, graphic copying, laser coding, and medical imaging. For example, in a printer or copier product that forms an image on a recording medium, an optical scanning device is used to scan and form an electrostatic latent image on a scanned surface of a photosensitive drum, and the electrostatic latent image is transferred to a paper surface for printing or copying after a development process. The optical scanning device has a greater impact on the volume of the overall product, and it is necessary to shorten an optical path of the optical scanning device to reduce the volume of the optical scanning device, thereby reducing the volume of the overall product.

An existing optical scanning device usually uses an F-θ lens as an imaging optical system. The optical path is shortened by shortening a distance between an optical deflector and the imaging optical system, and changing an refractive index and surface curvature of the lens system.

The miniaturization of the existing optical scanning device is likely to cause problems including image distortion and deterioration of linear scanning performance. Therefore, the image quality of the existing optical scanning device after miniaturization is not good.

SUMMARY

One aspect of the present disclosure provides an optical scanning device. The device includes: a light source, configured to emit a light beam; a first optical unit, configured to collimate the light beam emitted by the light source in a main scanning direction and focus the light beam emitted by the light source in an auxiliary scanning direction; an optical deflector, configured to deflect the light beam emitted from the first optical unit; and an imaging optical system, configured to guide the light beam deflected by the optical deflector to a scanned surface for imaging. The imaging optical system includes an F-θ lens. An effective area of a surface of the F-θ lens receiving the deflected light emitted from the optical deflector is an incident surface, and an effective area of a surface where the F-θ lens emits and forms scanning light is an exit surface. An intersection of a straight line, where the light beam incident on the optical deflector is located, and a main optical axis of the F-θ lens is a scanning origin. Intersections of the light beam and the incident surface of the F-θ lens are incident points. An intersection of the incident surface of the F-θ lens and the main optical axis is a central incident point. Intersections of the light beam and the exit surface of the F-θ lens are exit points. An intersection of the exit surface of the F-θ lens and the main optical axis is a central exit point. The F-θ lens is configured to satisfy:

$$fc/fs \leq 0.6, \tag{Eq. 1}$$

$$X1 - X1c > 0, \text{ and} \tag{Eq. 2}$$

$$X2 - X2c > 0; \tag{Eq. 3}$$

where fc is an fθ coefficient of the F-θ lens; fs is a focal length of the F-θ lens; X1 is a distance between a projection of any one of the incident points on the main optical axis and the scanning origin, X2 is a distance between a projection of any one of the exit points on the main optical axis and the scanning origin, X1c is a distance between the central incident point and the scanning origin, and X2c is a distance between the central exit point and the scanning origin. An incident point of the incident points on the incident surface with a farthest distance from the main optical axis is an edge incident point. The F-θ lens is further configured to satisfy $0.5 \leq (X1max - X1c)/(X2c - X1c) \leq 0.6$, wherein X1max is a distance between a projection of the edge incident point on the main optical axis and the scanning origin. An exit point of the exit points on the exit surface with a farthest distance from the main optical axis is an edge exit point. The F-θ lens is further configured to satisfy: $0 \leq (X2max - X2c)/(X2c - X1c) \leq 0.1$, where X2max is a distance between a projection of the edge exit point on the main optical axis and the scanning origin.

Another aspect of the present disclosure provides an electronic imaging apparatus. The electronic imaging apparatus includes an optical scanning device, a photosensitive drum, a developing device configured to make the electrostatic latent image develop to form a toner image, a transfer device configured to transfer the toner image to a transfer medium, and a fixing device configured to fix the transferred toner image on the transfer medium. The optical scanning device includes: a light source, configured to emit a light beam; a first optical unit, configured to collimate the light beam emitted by the light source in a main scanning direction and focus the light beam emitted by the light source in an auxiliary scanning direction; an optical deflector, configured to deflect the light beam emitted from the first optical unit; and an imaging optical system, configured to guide the light beam deflected by the optical deflector to a scanned surface for imaging. The imaging optical system includes an F-θ lens. An effective area of a surface of the F-θ lens receiving the deflected light emitted from the optical deflector is an incident surface, and an effective area of a surface where the F-θ lens emits and forms scanning light is an exit surface. An intersection of a straight line, where the light beam incident on the optical deflector is located, and a main optical axis of the F-θ lens is a scanning origin. Intersections of the light beam and the incident surface of the F-θ lens are incident points. An intersection of the incident surface of the F-θ lens and the main optical axis is a central incident point. Intersections of the light beam and the exit surface of the F-θ lens are exit points. An intersection of the exit surface of the F-θ lens and the main optical axis is a central exit point. The F-θ lens is configured to satisfy:

$$fc/fs \leq 0.6, \quad \text{(Eq. 1)}$$

$$X1 - X1c > 0, \text{ and} \quad \text{(Eq. 2)}$$

$$X2 - X2c > 0; \quad \text{(Eq. 3)}$$

where fc is an fθ coefficient of the F-θ lens; fs is a focal length of the F-θ lens; X1 is a distance between a projection of any one of the incident points on the main optical axis and the scanning origin, X2 is a distance between a projection of any one of the exit points on the main optical axis and the scanning origin, X1c is a distance between the central incident point and the scanning origin, and X2c is a distance between the central exit point and the scanning origin. An incident point of the incident points on the incident surface with a farthest distance from the main optical axis is an edge incident point. The F-θ lens is further configured to satisfy 0.5≤(X1max−X1c)/(X2c−X1c)≤0.6, wherein X1max is a distance between a projection of the edge incident point on the main optical axis and the scanning origin. An exit point of the exit points on the exit surface with a farthest distance from the main optical axis is an edge exit point. The F-θ lens is further configured to satisfy: 0≤(X2max−X2c)/(X2c−X1c)≤0.1, where X2max is a distance between a projection of the edge exit point on the main optical axis and the scanning origin. The optical scanning device and the photosensitive drum are configured cooperatively, and the light beam from the optical scanning device forms an electrostatic latent image on a photosensitive surface of the photosensitive drum.

Other aspects or embodiments of the present disclosure can be understood by those skilled in the art in light of the description, the claims, and the drawings of the present disclosure.

BRIEF DESCRIPTION OF THE DRAWINGS

The following drawings are merely examples for illustrative purposes according to various disclosed embodiments and are not intended to limit the scope of the present disclosure.

DETAILED DESCRIPTION

Figure 1:
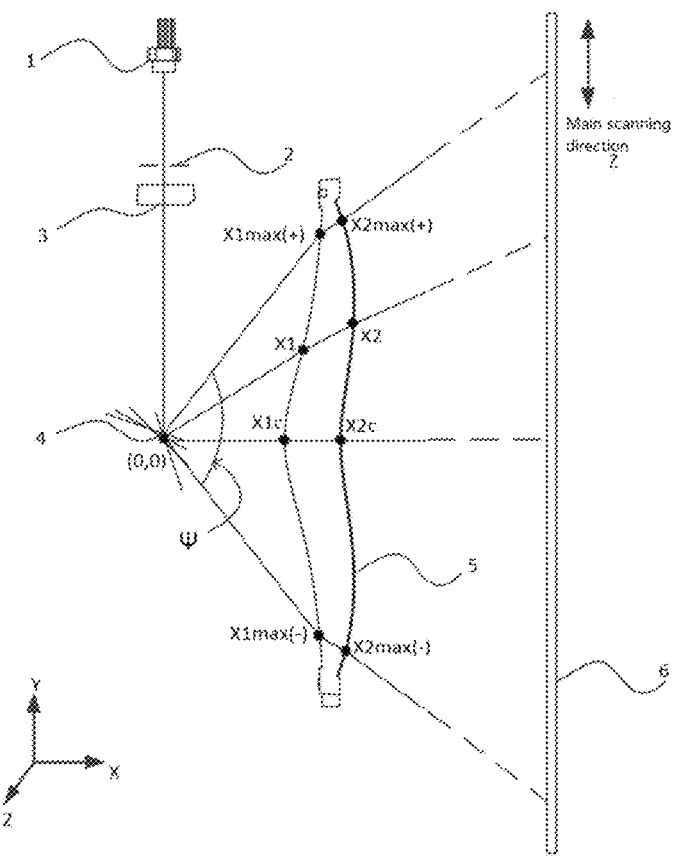
FIG. 1 illustrates an optical structure of an main scanning surface of an exemplary optical scanning device consistent with various disclosed embodiments in the present disclosure.

Reference will now be made in detail to exemplary embodiments of the disclosure, which are illustrated in the accompanying drawings. Hereinafter, embodiments consistent with the disclosure will be described with reference to drawings. In the drawings, the shape and size may be exaggerated, distorted, or simplified for clarity. Wherever possible, the same reference numbers will be used throughout the drawings to refer to the same or like parts, and a detailed description thereof may be omitted.

Further, in the present disclosure, the disclosed embodiments and the features of the disclosed embodiments may be combined under conditions without conflicts. It is apparent that the described embodiments are some but not all of the embodiments of the present disclosure. Based on the disclosed embodiments, persons of ordinary skill in the art may derive other embodiments consistent with the present disclosure, all of which are within the scope of the present disclosure.

Moreover, the present disclosure is described with reference to schematic diagrams. For the convenience of descriptions of the embodiments, the cross-sectional views illustrating the device structures may not follow the common proportion and may be partially exaggerated. Besides, those schematic diagrams are merely examples, and not intended to limit the scope of the disclosure. Furthermore, a three-dimensional (3D) size including length, width and depth should be considered during practical fabrication.

In the following various embodiments, the term "F-theta lens" is also called "f-theta lens". For monochromatic light imaging, an image surface of this type of lens is a flat surface, and the image quality of the entire image surface is consistent with small aberrations. For a certain incident light, a deflection speed corresponds to a certain scanning speed, such that the incident light with equal angular velocity can be used to achieve linear scanning at equal linear velocity.

In the following various embodiments, the term "fθ coefficient" refers to the ratio of 1/2 of the scanned image height h to the rotation angle θ of the optical deflector, that is, the value of h/(2θ). The rotation angle θ of the optical deflector is not the beam deflection angle, but should be understood as the rotation angle of the rotation axis of the optical deflector. When the light beam deflected by the optical deflector is completely parallel light, the fθ coefficient is equal to the focal distance of the scanning optical system.

In the following various embodiments, the term "main scanning direction" refers to the direction perpendicular to both the rotation axis of the optical deflector and the main optical axis of the imaging optical system, and can also be understood as the direction of the light beam scanning back and forth after the optical deflector deflects the light beam emitted by the light source.

Correspondingly, the term "auxiliary scanning direction" can be understood as a direction parallel to the rotation axis of the optical deflector, and can also be understood as a direction perpendicular to the main scanning direction.

Correspondingly, the term "scanning plane" refers to the plane on which the outgoing light beam of the imaging optical system scans back and forth.

One embodiment of the present disclosure in FIG. 1 provides an optical scanning device. As shown in FIG. 1, the optical scanning device may include a light source 1, a diaphragm 2, a first optical unit 3, an optical deflector 4, and an imaging optical system 5.

The light source 1 may be used to emit a light beam. The first optical unit 3 may be used to collimate and focus the light beam emitted by the light source 1. The optical deflector 4 may be used to deflect the light beam emitted by the first optical unit 3, such that the light beam emitted by the first optical unit 3 may be deflected in the main scanning direction and incident onto a scanned surface 6. Further, as the optical deflector 4 rotates, the light beam may scan back and forth on the scanned surface 6. An optional structure of the optical deflector 4 may be a rotating optical polyhedron with a plurality of reflecting mirror surfaces (for example, a rotating hexahedron with 6 reflecting mirror surfaces), or a transparent disk containing a plurality of lenses. The optical deflector 4 may also be provided with a rotation controller to control the rotation angle and speed of the optical deflector 4. The light beam emitted by the light source 1 may incident on mirror surfaces of the optical deflector 4, be deflected and reflected toward the scanned surface 6. As the optical deflector 4 rotates, the light beam may scan along the main scanning direction Z on the scanned surface 6.

The imaging optical system 5 may be used to guide the light beam deflected by the optical deflector 4 to the scanned surface 6 for imaging. The imaging optical system 5 may be disposed between the optical deflector 4 and the scanned surface 6, such that the light beam deflected by the optical deflector 4 could form an image on the scanned surface 6. The imaging optical system 5 may be a plastic optical element or a glass optical element. The imaging optical system 5 may be a single F-θ lens, or a plurality of F-θ lenses, or a combination of an F-θ lenses and mirrors. In one embodiment shown in FIG. 1, the imaging optical system 5 may be a single F-θ lens. In this embodiment, by using a single F-θ lens as the imaging optical system 5, the light beam deflected by the optical deflector 4 can be scanned on the scanned surface 6 at a constant linear velocity in the main scanning direction Z, and may be focused in the main scanning direction Z and the auxiliary scanning direction Y of the surface 6 to form a light spot.

Figure 2:
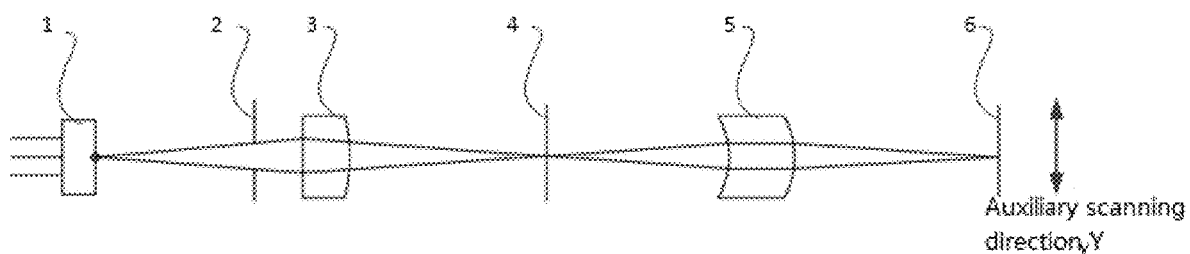
FIG. 2 illustrates an optical structure of an auxiliary scanning surface of an exemplary optical scanning device consistent with various disclosed embodiments in the present disclosure.

FIG. 2 shows an optical structure of an auxiliary scanning surface of an optical scanning device according to one embodiment of the present disclosure. The structure shown in FIG. 2 illustrates the side view structure and an optical path of the optical scanning device. The light source 1 can be understood as an integrated light source that directly emits a modulated and shaped light beam. In the structure shown in FIG. 2, the light source 1 may be an electric light source for emitting a light beam, and the light beam may be shaped after passing through the diaphragm 2, and the first optical unit 3 may collimate and focus the shaped light beam. Focusing of the first optical unit 3 may be mainly focusing in the auxiliary scanning direction Y. In the embodiment shown in FIG. 2, the optical deflector 4 may reflect or refract the light beam emitted from the first optical unit 3 to realize the deflection of the light beam propagation direction, such that the light beam enters the F-θ lens of the imaging optical system 5. As shown in FIG. 1, the light beam may be refracted on the incident surface and the exit surface of the F-θ lens, and the obtained scanning light may incident on the scanned surface 6. The scanned surface 6 may be a surface provided by a photosensitive drum, for example.

In the embodiment shown in FIG. 1, the imaging optical system 5 may be a single F-θ lens. An effective area of a surface of the F-θ lens receiving the deflected light emitted from the optical deflector 4 may be an incident surface, and an effective area of a surface where the F-θ lens emits the scanning light is an exit surface. It can be understood that under the control of the optical deflector 4, the deflected light beam may incident on a surface of a side of the F-θ lens near the optical deflector 4 as shown in FIG. 1 (hereinafter referred to as the left side surface), correspondingly an area of the left side surface where the incident light can reach may be the incident surface of the F-θ lens. Under different deflection angles, the range in which the incident surface of the F-θ lens occupies the left side surface of the F-θ lens may be different. For example, when the maximum deflection angle of the light beam is small, the left surface that the incident light effectively uses may be small and the effective incident surface of the light beam may be small. When the maximum deflection angle of the light beam is large, the left surface that the incident light effectively uses may be large and the effective incident surface of the light beam may be large. Opposite to the incident surface, the exit surface may refer to a surface of another side of the F-θ lens close to the scanned surface 6 shown in FIG. 1 (hereinafter referred to as the right side surface), and an area of the right side that the exiting beam can reach may be the exit surface of the F-theta lens. Under different deflection angles, the effective exit surface of the F-theta lens may occupy a different range of its left side surface.

An exit point of the light beam deflected by the optical deflector 4 may be a scanning origin (0, 0), and the scanning origin may be located on the main optical axis of the F-θ lens. In the present embodiment, intersection points of the light beam and the incident surface of the F-θ lens may be incident points, and a point where the incident surface of the F-θ lens intersects the main optical axis may be a central incident point. The intersection points of the light beam and the exit surface of the F-θ lens may be exit points, and the point where the exit surface of the F-θ lens intersects the main optical axis may be the central exit point. In one embodiment of the present disclosure, to achieve a balance between the volume, manufacturing cost, and optical performance of the optical scanning device such that high-precision scanned images can be obtained while miniaturization and low cost of the optical scanning device can be realized, the F-θ lens may be configured to satisfy the following requirements:

$$fc/fs \leq 0.6, \tag{Eq. 1}$$

$$X1 - X1c > 0, \text{ and} \tag{Eq. 2}$$

$$X2 - X2c > 0; \tag{Eq. 3}$$

where fs is the focal length of the F-θ lens; fc is the fθ coefficient of the F-θ lens; X1 is the distance between a projection of any one of the incident points on the main optical axis and the scanning origin, and can also be understood as a distance between a projection of the intersection of any light beam in the effective scanning area with the incident surface of the F-θ lens on the main optical axis and the scanning origin; X2 is the distance between a projection of any one of exit points on the main optical axis and the scanning origin, and can also be understood as a distance between a projection of the intersection of any light beam in the effective scanning area with the exit surface of the F-θ lens on the main optical axis and the scanning origin; X1c is the distance between the central incident point and the scanning origin and can also be understood as a distance between the intersection of the light beam and the incident surface of the F-θ lens along the main optical axis and the scanning origin; X2c is a distance between the central exit point and the scanning origin and can also be understood as a distance between the intersection of the light beam and the exit surface of the F-θ lens along the main optical axis and the scanning origin.

It can be understood that the intersection of the light reflecting surface of the optical deflector 4 and the main optical axis of the F-θ lens may be the coordinate origin; X1 may represent coordinates of the intersection of any principal ray of the effective scanning beam and the incident surface of the F-θ lens at the main optical axis; X2 may represent coordinates of the intersection of any principal ray of the effective scanning beam and the exit surface of the F-θ lens in the direction of the main optical axis; X1c may represent coordinates of the intersection of the principal ray of the beam along the main optical axis and the incident surface of the F-θ lens in the optical axis direction; X2c represents the coordinates of the intersection of the principal ray of the light beam along the main optical axis and the exit surface of the F-θ lens in the optical axis direction.

As the optical scanning device shown in FIG. 1 and FIG. 2, the present disclosure provides two optional implementations below to analyze the image straightness and error of the optical scanning device of the present disclosure. Detailed parameters are shown in Table 1 and Table 2.

TABLE 1

| Parameter | Value |
| --- | --- |
| Optical resolution | 600 dpi |
| Reference wavelength λ | 788 nm |
| Number of deflecting faces of optical deflector | 4 |
| Deflecting angle of optical deflector | ±26.04° |
| Diameter of circumscribed circle of optical deflector | 20 mm |
| Center coordinates of the optical deflector $X_0$ | −5.78 |
| Center coordinates of the optical deflector $Z_0$ | −4.22 |
| Effective scanning angle Ψ | 104.15° |
| Focal distance of F-θlens fs | 198.575 mm |
| Coefficient of F-θlens fc | 118.826 mm |
| X1c | 21.90 mm |
| X2c | 30.90 mm |
| X1 | 21.9~27.29 mm |
| X2 | 30.9~33.24 mm |
| $X1_{max}$ (+) | 27.12 mm |
| $X2_{max}$ (+) | 31.7 mm |

In one embodiment shown in Table 1, the optical scanning device may satisfy a resolution of 600 dpi, and a wavelength of the light beam of the light source 1 may be about 788 nm. The focal distance fs of the F-θ lens fs may be about 198.575 mm, and the fθ coefficient of the F-θ lens fs may be about 118.826 mm.

It can be seen that fc/fs=118.826/198.575=0.598<0.6, which satisfies the above Eq. 1.

As shown in Table 1, the distance X1c between the central incident point and the scanning origin may be 21.90 mm. The distance X1 between the projection of the incident point on the main optical axis and the scanning origin may be 21.9-27.29 mm.

It can be seen that X1−X1c>0, also satisfying the above Eq. 2.

As shown in Table 1, the distance X2c between the central exit point and the scanning origin may be 30.90 mm. The distance X2 between the projection point of the exit point on the main optical axis and the scanning origin may be 30.9~33.24 mm.

It can be seen that X2−X2c>0, also satisfying the above Eq. 3.

The embodiment shown in Table 1 may satisfy Eq. 1 to Eq. 3 simultaneously. Correspondingly, the optical scanning device can be easily reduced in size and manufacturing cost.

In one embodiment shown in Table 2, the optical scanning device may satisfy a resolution of 600 dpi, and a wavelength of the light beam of the light source 1 may be about 788 nm. The focal distance fs of the F-θ lens fs may be about 197.594 mm, and the fθ coefficient of the F-θ lens fs may be about 116.576 mm.

It can be seen that fc/fs=116.576/197.594=0.590<0.6, which satisfies the above Eq. 1.

TABLE 2

| Parameter | Value |
| --- | --- |
| Optical resolution | 600 dpi |
| Reference wavelength λ | 788 nm |
| Number of deflecting faces of optical deflector | 4 |
| Deflecting angle of optical deflector | ±26.04° |
| Diameter of circumscribed circle of optical deflector | 20 mm |
| Center coordinates of the optical deflector $X_0$ | −5.78 |
| Center coordinates of the optical deflector $Z_0$ | −4.22 |
| Effective scanning angle Ψ | 104.15° |
| Focal distance of F-θlens fs | 197.594 mm |
| Coefficient of F-θlens fc | 116.576 mm |
| X1c | 22.30 mm |
| X2c | 31.30 mm |
| X1 | 22.30~27.59 mm |
| X2 | 31.30~33.55 mm |
| $X1_{max}$ (+) | 27.43 mm |
| $X2_{max}$ (+) | 32.01 mm |

As shown in Table 2, the distance X1c between the central incident point and the scanning origin may be 22.30 mm. The distance X1 between the projection of the incident point on the main optical axis and the scanning origin may be 22.30-27.59 mm.

It can be seen that X1−X1c>0, also satisfying the above Eq. 2.

As shown in Table 2, the distance X2c between the central exit point and the scanning origin may be 31.30 mm. The distance X2 between the projection point of the exit point on the main optical axis and the scanning origin may be 31.30~33.55 mm.

It can be seen that X2−X2c>0, also satisfying the above Eq. 3.

The embodiment shown in Table 2 may satisfy Eq. 1 to Eq. 3 simultaneously. Correspondingly, the optical scanning device can be easily reduced in size and manufacturing cost.

Preferably, based on the foregoing embodiments, to improve the accuracy of the optical scanning device and achieve higher scanning accuracy, in some other embodiments, the F-θ lens may also satisfy Eq. 4: 0.5≤(X1max−X1c)/(X2c−X1c)≤0.6, where the incident point on the incident surface of the light beam with the farthest distance from the main optical axis is the edge incident point, and X1max is a distance between a projection of the edge incident point on the main optical axis and the scanning origin.

The exit point on the exit surface of the light beam with the farthest distance from the main optical axis is the edge exit point. The F-θ lens may also be configured to satisfy: 0≤(X2max−X2c)/(X2c−X1c)≤0.1 (Eq. 5), where X2max is a distance between a projection of the edge exit point on the main optical axis and the scanning origin.

Figure 3:
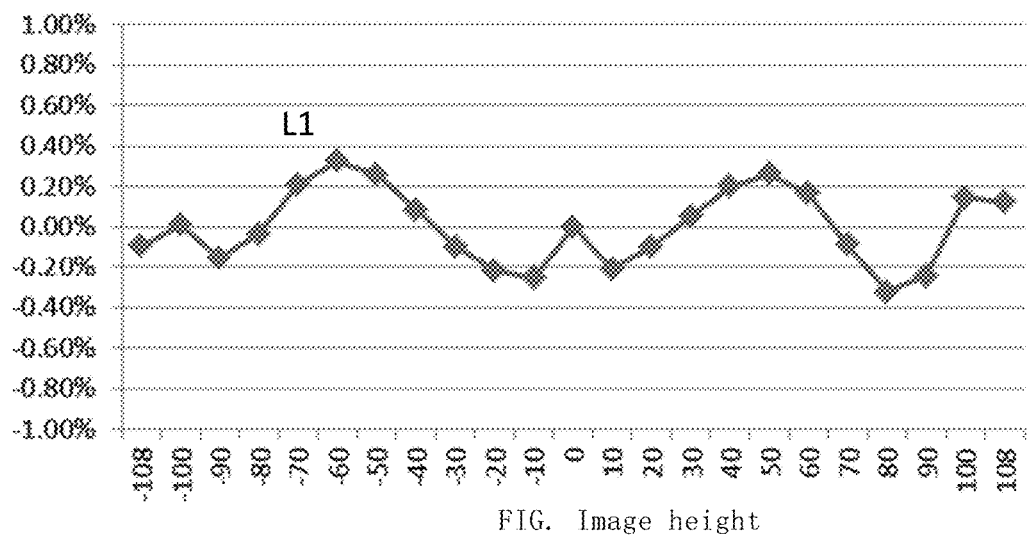
FIG. 3 illustrates a straightness measurement curve of a scanning image corresponding to Table 1 consistent with various disclosed embodiments in the present disclosure.
Figure 4:
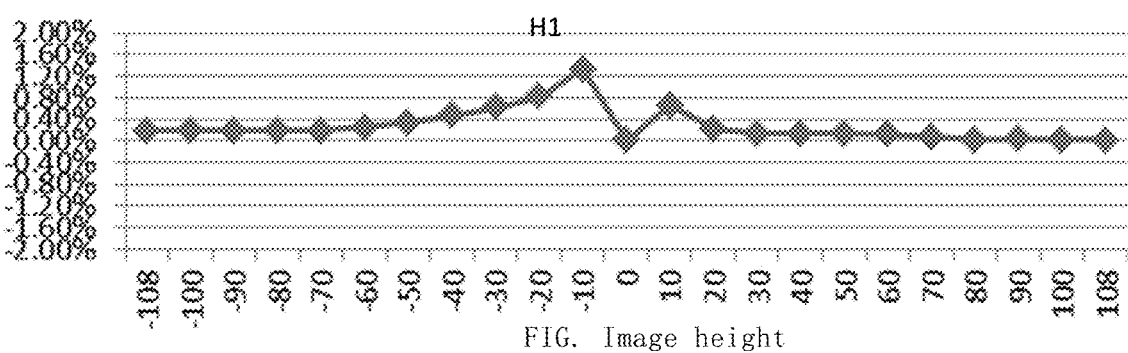
FIG. 4 illustrates a height error measurement curve of a scanning image corresponding to Table 1 consistent with various disclosed embodiments in the present disclosure.

FIG. 3 illustrates a straightness measurement curve of a scanning image corresponding to Table 1 consistent with various disclosed embodiments in the present disclosure; and FIG. 4 illustrates a height error measurement curve of a scanning image corresponding to Table 1 consistent with various disclosed embodiments in the present disclosure. For the optical scanning device shown in FIG. 1, the vertical axis of FIG. 3 is the straightness of the scanned image on the scanned surface 6, the horizontal axis of FIG. 3 is the coordinates on the scanned surface 6 with a unit of millimeter (mm). In FIG. 3, the coordinate 0 point is located at the intersection of the main optical axis of the imaging system and the scanned surface 6, the abscissa −108 point and the abscissa 108 point are respectively located at the two ends of the scanned surface 6 along the main scanning direction, that is, the maximum positions of both ends that can be scanned by the scanning light. The maximum straightness of the scanned image shown in FIG. 3 appears on the L1 point of FIG. 3, and its value is 0.33%, while the straightness of other scanning positions is less than 0.33%, which has high scanning straightness. The vertical axis of FIG. 4 is the height error of the scanned image on the scanned surface 6, which can be understood as the error of the actual height of the scanned image relative to the standard image height. The horizontal axis of FIG. 4 is also the coordinates on the scanned surface 6. The actual height of the scanned image can be understood as the intersection of the main optical axis and the scanned surface 6 as the height 0 point, and the distance between the intersection of the incident beam and the scanned surface 6 and the height 0 point is the image height of other imaging points on the scanning surface. The maximum scanned image height error shown in FIG. 4 appears at point H1 in FIG. 4, and its value is 1.32%, while the height error of other scanned images is less than 1.32%. It can be seen that the image height error of the embodiment shown in Table 1 is relatively small and the optical scanning device may have higher accuracy.

Figure 5:
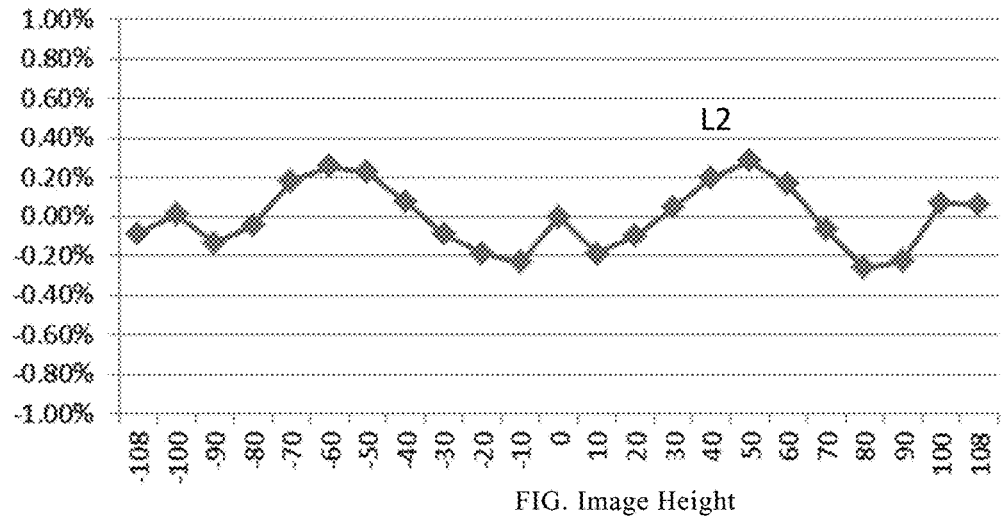
FIG. 5 illustrates a straightness measurement curve of a scanning image corresponding to Table 2 consistent with various disclosed embodiments in the present disclosure.
Figure 6:
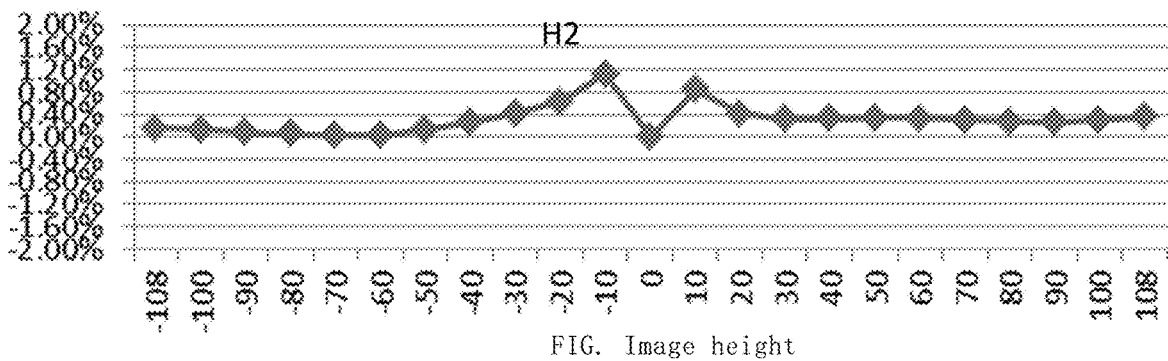
FIG. 6 illustrates a height error measurement curve of a scanning image corresponding to Table 2 consistent with various disclosed embodiments in the present disclosure.

FIG. 5 illustrates a straightness measurement curve of a scanning image corresponding to Table 2 consistent with various disclosed embodiments in the present disclosure; and FIG. 6 illustrates a height error measurement curve of a scanning image corresponding to Table 2 consistent with various disclosed embodiments in the present disclosure. For the optical scanning device shown in FIG. 1, the vertical axis of FIG. 5 is the straightness of the scanned image on the scanned surface 6, the horizontal axis of FIG. 5 is the coordinates on the scanned surface 6 with a unit of millimeter (mm). In FIG. 5, the coordinate 0 point is located at the intersection of the main optical axis of the imaging system and the scanned surface 6, the abscissa −108 point and the abscissa 108 point are respectively located at the two ends of the scanned surface 6 along the main scanning direction, that is, the maximum positions of both ends that can be scanned by the scanning light. The maximum straightness of the scanned image shown in FIG. 5 appears on the L2 point of FIG. 5, and its value is 0.28%, while the straightness of other scanning positions is less than 0.28%, which has high scanning straightness. The vertical axis of FIG. 6 is the height error of the scanned image on the scanned surface 6, which can be understood as the error of the actual height of the scanned image relative to the standard image height. The horizontal axis of FIG. 6 is also the coordinates on the scanned surface 6. The actual height of the scanned image can be understood as the intersection of the main optical axis and the scanned surface 6 as the height 0 point, and the distance between the intersection of the incident beam and the scanned surface 6 and the height 0 point is the image height of other imaging points on the scanning surface. The maximum scanned image height error shown in FIG. 6 appears at point H2 in FIG. 6, and its value is 1.12%, while the height error of other scanned images is less than 1.12%. It can be seen that the image height error of the embodiment shown in Table 1 is relatively small and the optical scanning device may have higher accuracy.

In the above optional embodiments, in the main scanning direction of the scanning light beam, the F-θ lens may include a lens upper part and a lens lower part arranged on two sides of the main optical axis respectively, as shown in FIG. 1. The incident point on the incident surface of the upper part of the lens that is farthest from the main optical axis may be the upper edge incident point, and the incident point on the incident surface of the lower part of the lens that is farthest from the main optical axis may be the lower edge incident point. The exit point on the exit surface of the upper part of the lens that is the farthest away from the main optical axis may be the upper edge exit point, and the exit point on the exit surface of the lower part of the lens that is the farthest away from the main optical axis may be the lower edge exit point.

In the embodiment shown in Table 1, the F-θ lens may be specifically configured to satisfy: the distance X1max(+) between the projection of the upper edge incident point on the main optical axis and the scanning origin is 27.12 mm, the distance X2max(+) between the projection of the upper edge exit point on the main optical axis and the scanning origin is 31.7 mm; the distance X1max(−) between the projection of the lower edge incident point on the main optical axis and the scanning origin is 27.29 mm; and the distance X2max(−) between the projection of the lower edge exit point on the main optical axis and the scanning origin is 31.19 mm.

In the embodiment shown in Table 1, the straightness of the scanned image is less than or equal to 0.33%, and the height error is less than or equal to 1.32%. In Table 1, $$(X1_{max}(+)-X1c)/(X2c-X1c)=0.599;$$

$$(X1_{max}(-)-X1c)/(X2c-X1c)=0.580;$$

$$(X2_{max}(+)-X2c)/(X2c-X1c)=0.089;$$

$$(X2_{max}(-)-X2c)/(X2c-X1c)=0.033.$$

It can be seen that the F-θ lens in the embodiment in Table 1 also satisfies Eq. 4 and Eq. 5. High accuracy of the scanning may be guaranteed while the miniaturization is achieved.

In the embodiment shown in Table 2, the F-θ lens may be specifically configured to satisfy: the distance X1max(+) between the projection of the upper edge incident point on the main optical axis and the scanning origin is 27.43 mm, the distance X2max(+) between the projection of the upper edge exit point on the main optical axis and the scanning origin is 32.01 mm; the distance X1max(−) between the projection of the lower edge incident point on the main optical axis and the scanning origin is 27.59 mm; and the distance X2max(−) between the projection of the lower edge exit point on the main optical axis and the scanning origin is 31.49 mm.

In the embodiment shown in Table 2, the straightness of the scanned image is less than or equal to 0.28%, and the height error is less than or equal to 1.12%. In Table 2, $$(X1_{max}(+)-X1c)/(X2c-X1c)=0.587;$$

$$(X1_{max}(-)-X1c)/(X2c-X1c)=0.570;$$

$$(X2_{max}(+)-X2c)/(X2c-X1c)=0.079;$$

$$(X2_{max}(-)-X2c)/(X2c-X1c)=0.021.$$

It can be seen that the F-θ lens in the embodiment in Table 2 also satisfies Eq. 4 and Eq. 5. High accuracy of the scanning may be guaranteed while the miniaturization is achieved.

Based on the above-mentioned embodiments, the F-θ lens may also satisfy: other exit points between the central exit point and the edge exit point include the farthest exit point, where the farthest exit point is the exit point corresponding to the maximum value of X2. It can also be understood that the F-θ lens can be designed such that the exit point at which X2 takes the maximum coordinate is the exit point located between X2c and X2max. In the present disclosure, referring to FIG. 1, the intersection of the line where the incident light is incident on the optical deflector 4 and the line where the main optical axis is located may be the scanning origin, and the main optical axis is the horizontal axis parallel to the main scanning direction Z at the scanning origin. The main optical axis may be the vertical axis, and the point farthest from the vertical axis on the exit surface of the F-θ lens may be the farthest exit point. On the exit surface of the F-θ lens, the two endpoints farthest from the horizontal axis may be the edge exit points, namely X2max (+) and X2max (−) respectively.

In various embodiments of the present disclosure, the light source 1 and the optical deflector 4 may have the same structures, and only the imaging optical system 5 may be changed in variables. Optionally, the light source 1 may be at least one point light source that can be modulated, such that the size of the light beam emitted by the light source 1 can be modulated.

The opening of the diaphragm 2 may shape the light beam emitted by the light source 1, and the opening may be, for example, a circle, an ellipse, or a square. Although the diaphragm 2 is provided between the light source 1 and the first optical unit 3 in FIG. 1 and FIG. 2, the position of the diaphragm 2 is not limited by this. For example, in some other embodiments, the diaphragm 2 may be provided between the first optical system 5 and the optical deflector 4. In some embodiments, the diaphragm 2 can also be omitted.

Optionally, the first optical unit 3 may be an anamorphic lens or a cylindrical collimating lens. The anamorphic lens can be understood as a lens that performs both the functions of a collimator lens and a cylindrical lens.

Optionally, the optical deflector 4 may include a polyhedron body, and surfaces of the polyhedron body may form a plurality of mirror surfaces. The polyhedron body may rotate along a rotating shaft, and the central axis of the rotating shaft may be parallel to the auxiliary scanning direction. Preferably, the rotating polyhedron may have four reflecting mirror surfaces.

Figure 7:
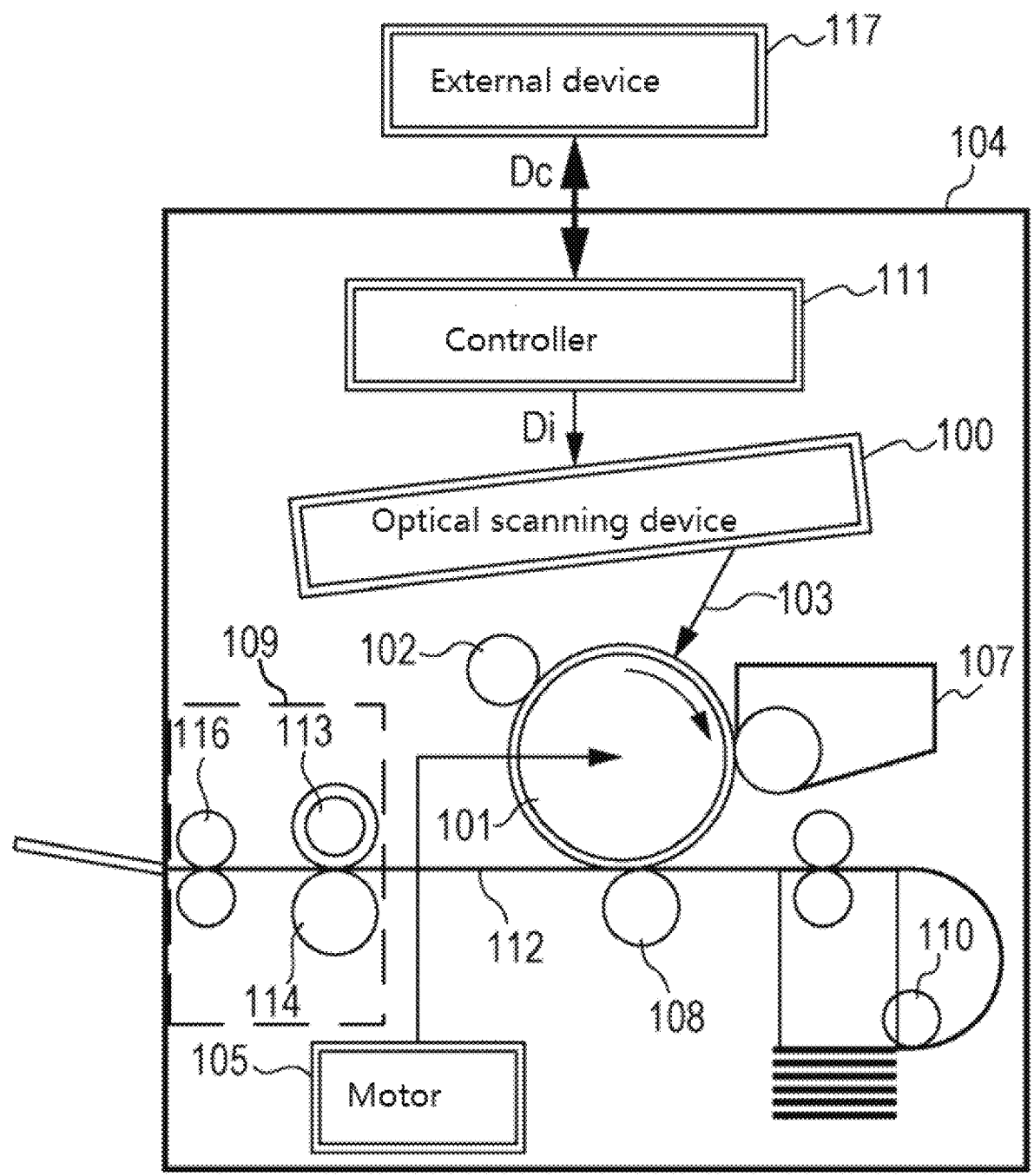
FIG. 7 illustrates an exemplary electronic imaging apparatus consistent with various disclosed embodiments in the present disclosure.

The present disclosure also provides an electronic imaging apparatus. As shown in FIG. 7, in one embodiment, the electronic imaging apparatus 104 may mainly include: an optical scanning device 100 provided by various embodiments of the present disclosure, a photosensitive drum 101, a developing device 107, a transfer device 108, and a fixing device 113.

The photosensitive drum 101 may include a scanned surface 6 and may be used to sense the light beam emitted by the optical scanning device on the scanned surface 6 to form an electrostatic latent image.

The developing device 107 may be used for developing the electrostatic latent image to form a toner image.

The transfer device 108 may be used to transfer the toner image to a transfer medium.

The fixing device 109 may be used to fix the transferred toner image on the transfer medium.

The electronic imaging apparatus 104 may receive input of code data Dc from an external device 117 including a personal computer. A controller 111 in the apparatus may convert the code data Dc into an image signal (dot data) Di. The image signal Di may be input to the optical scanning device 100 according to various embodiments of the present disclosure. The light beam 103 modulated according to the image signal Di may be emitted from the optical scanning device 100, and the light beam 103 may scan the photosensitive surface (for example, the scanned surface 6) of the photosensitive drum 101 in the main scanning direction. The controller 111 may not only perform the above-mentioned data conversion, but also control various components in the electronic imaging apparatus including a motor 105 described later. The photosensitive drum 101 may be used as an electrostatic latent image bearing member and may be driven by the motor 105 to rotate in a clockwise direction. During the rotation, the photosensitive surface of the photosensitive drum 101 may move relative to the light beam 103 in the auxiliary scanning direction. The photosensitive drum 101 may use a charging roller 102 arranged above the photosensitive drum 101 and in contact with the photosensitive surface, to make the photosensitive surface be uniformly charged. In one embodiment, the charging roller 102 may respond to irradiation of the light beam 103 of the optical scanning device 100, to charge the photosensitive surface. That is, when the scanning light beam emitted by the optical scanning device 100 is detected, the charging roller 102 may charge the photosensitive surface. In one embodiment, the developing device 107 (for example, a developer) may be further included. After irradiating the photosensitive surface with the light beam 103 to form an electrostatic latent image on the photosensitive surface, the developing device 107 arranged at downstream of the rotation direction of the photosensitive drum 101 in contact with the photosensitive surface may develop the electrostatic latent image into a toner image, beginning with the irradiating position of the light beam 103. The transfer device 108 (e.g., a transfer roller) arranged at downstream of the photoreceptor drum 101 and opposite to the photosensitive drum 101 may transfer the toner image developed by the developing device 107 to the transfer medium 112 (e.g., a sheet, a paper, or a photographic paper, etc.). The transfer medium 112 may be stored in a medium storage box at upstream of the photosensitive drum 101 (on the right in FIG. 7), and the feeding of the transfer medium may be continued to be maintained. A feed roller 110 may be provided at the edge of the medium storage box, such that the transfer medium 112 in the medium storage box can be fed to the conveying path. The transfer medium 112 to which the unfixed toner image is transferred as described above may be further conveyed to the fixing device 109 at downstream of the photosensitive drum 101 (the left side in FIG. 7). The fixing device 109 may include a fixing roller 113 in which a fixing heater (not shown) is provided, and a pressure roller 114 provided to press the fixing roller 113. The fixing device 109 may press the transfer medium 112 conveyed from the transfer roller 108 at the pressing portion of the fixing roller 113 and the pressure roller 114 while heating, thereby fixing the unfixed toner image on the transfer medium 112. Further, a discharge roller pair 116 may be provided at downstream of the fixing roller 113, such that the transfer medium 112 on which the toner image is fixed can be transported from the electronic imaging device 104 to the outside. This may complete the printing operation.

In the present disclosure, the optical scanning device includes a light source, a first optical unit, an optical deflector, and an imaging optical system, for guiding a light beam deflected by the optical deflector to a scanned surface for imaging. The imaging optical system includes an F-θ lens satisfying fc/fs≤0.6, X1−X1c>0, and X2−X2c>0, where fs is a focal length of the F-θ lens, fc is an fθ coefficient of the F-θ lens; X1 is a distance between a projection of any one of the incident points on the main optical axis and the scanning origin, X2 is a distance between a projection of any one of the exit points on the main optical axis and the scanning origin, X1c is a distance between the central incident point and the scanning origin, and X2c is a distance between the central exit point and the scanning origin. Therefore, the possibility of image distortion and deterioration of linear scanning performance may be reduced, and the accuracy of scanning imaging may be improved while the volume may be miniaturized. The imaging quality is improved.

In the description of the present disclosure, it should be understood that the terms "center", "length", "width", "thickness", "top", "bottom", "upper", "lower" and "Left", "right", "front", "rear", "vertical", "horizontal", "inner", "outer", "axial", "circumferential" and other indications or positional relationships are based on the attached drawings. The orientation or positional relationship shown in the drawings is only for the convenience of describing the present disclosure and simplifying the description, rather than indicating or implying that the position or the original must have a specific orientation, with a specific structure and operation, and therefore cannot be understood as a limit on the present disclosure.

In the present disclosure, unless otherwise clearly specified and limited, the terms "installed", "connected", "connected", "fixed", etc. should be interpreted broadly. For example, it may be a fixed connection or a detachable connection, or become a whole. It can be mechanically connected, electrical connection, or communication connection with each other. It can be directly connected or indirectly connected through an intermediate medium, which can make the internal communication of two components or the interaction relationship between two components. For those of ordinary skill in the art, the specific meaning of the above-mentioned terms in the present disclosure can be understood according to specific circumstances.

In the present disclosure, unless otherwise clearly defined and defined, that the first feature is above or below the second feature may include direct contact between the first and second features, or may include the first and second features not in direct contact but through other features between them. Moreover, the first feature "above", "at upper side of", or "on" the second feature of the first feature include the first feature being directly above and obliquely above the second feature, or merely indicating that the first feature is higher in level than the second feature. Similarly, the first feature "below", "under", or "beneath" the second feature may include the first feature directly below and obliquely below the second feature, or simply means that the level of the first feature is smaller than the second feature.

Various embodiments have been described to illustrate the operation principles and exemplary implementations. It should be understood by those skilled in the art that the present disclosure is not limited to the specific embodiments described herein and that various other obvious changes, rearrangements, and substitutions will occur to those skilled in the art without departing from the scope of the disclosure. Thus, while the present disclosure has been described in detail with reference to the above described embodiments, the present disclosure is not limited to the above described embodiments, but may be embodied in other equivalent forms without departing from the scope of the present disclosure, which is determined by the appended claims.

What is claimed is:

1. An optical scanning device, comprising:
a light source, configured to emit a light beam;
a first optical unit, configured to collimate the light beam emitted by the light source in a main scanning direction and focus the light beam emitted by the light source in an auxiliary scanning direction;
an optical deflector, configured to deflect the light beam emitted from the first optical unit; and
an imaging optical system, configured to guide the light beam deflected by the optical deflector to a scanned surface for imaging,
wherein:
the imaging optical system includes an F-θ lens;
an effective area of a surface of the F-θ lens receiving the deflected light emitted from the optical deflector is an incident surface, and an effective area of a surface where the F-θ lens emits and forms scanning light is an exit surface;
an intersection of a straight line, where the light beam incident on the optical deflector is located, and a main optical axis of the F-θ lens is a scanning origin;
intersections of the light beam and the incident surface of the F-θ lens are incident points;
an intersection of the incident surface of the F-θ lens and the main optical axis is a central incident point;
intersections of the light beam and the exit surface of the F-θ lens are exit points;
an intersection of the exit surface of the F-θ lens and the main optical axis is a central exit point;
the F-θ lens is configured to satisfy:

$$fc/fs \le 0.6, \qquad \text{(Eq. 1)}$$

$$X1 - X1c > 0, \text{ and} \qquad \text{(Eq. 2)}$$

$$X2 - X2c > 0; \qquad \text{(Eq. 3)}$$

wherein fc is an fθ coefficient of the F-θ lens; fs is a focal length of the F-θ lens; X1 is a distance between a projection of any one of the incident points on the main optical axis and the scanning origin, X2 is a distance between a projection of any one of the exit points on the main optical axis and the scanning origin, X1c is a distance between the central incident point and the scanning origin, and X2c is a distance between the central exit point and the scanning origin;
an incident point of the incident points on the incident surface with a farthest distance from the main optical axis is an edge incident point;
the F-θ lens is further configured to satisfy 0.5≤(X1max−X1c)/(X2c−X1c)≤0.6, wherein X1max is a distance between a projection of the edge incident point on the main optical axis and the scanning origin;

an exit point of the exit points on the exit surface with a farthest distance from the main optical axis is an edge exit point; and the F-θ lens is further configured to satisfy: 0≤(X2max−X2c)/(X2c−X1c)≤0.1, wherein X2max is a distance between a projection of the edge exit point on the main optical axis and the scanning origin.

2. The device according to claim 1, wherein the F-θ lens is further configured to satisfy:

other exit points between the central exit point and the edge exit point include another farthest exit point, wherein the another farthest exit point is an exit point of the exit points corresponding to a maximum value of X2.

3. The device according to claim 1, wherein:
X1c=21.90 mm,
X2c=30.90 mm,
21.90 mm<X1<27.29 mm, and
30.9 mm<X2<33.24 mm.

4. The device according to claim 1, wherein:
X1max=27.12 mm, and X2max=31.7 mm.

5. The device according to claim 1, further including a diaphragm unit disposed between the light source and the first optical unit, and configured to shape the light beam emitted by the light source.

6. The device according to claim 1, wherein:
the first optical unit includes an anamorphic lens, or
the first optical unit includes an independent collimating lens and a cylindrical lens.

7. The device according to claim 1, wherein:
the optical deflector includes a polyhedron body;
surfaces of the polyhedron body form a plurality of mirror surfaces; and
the polyhedron body rotates along a rotating shaft, wherein a central axis of the rotating shaft is parallel to the auxiliary scanning direction.

8. An electronic imaging apparatus, comprising:
an optical scanning device including:
a light source, configured to emit a light beam;
a first optical unit, configured to collimate the light beam emitted by the light source in a main scanning direction and focus the light beam emitted by the light source in an auxiliary scanning direction;
an optical deflector, configured to deflect the light beam emitted from the first optical unit; and
an imaging optical system, configured to guide the light beam deflected by the optical deflector to a scanned surface for imaging,
wherein:
the imaging optical system includes an F-θ lens;
an effective area of a surface of the F-θ lens receiving the deflected light emitted from the optical deflector is an incident surface, and an effective area of a surface where the F-θ lens emits and forms scanning light is an exit surface;
an intersection of a straight line, where the light beam incident on the optical deflector is located, and a main optical axis of the F-θ lens is a scanning origin;

intersections of the light beam and the incident surface of the F-θ lens are incident points;
an intersection of the incident surface of the F-θ lens and the main optical axis is a central incident point;
intersections of the light beam and the exit surface of the F-θ lens are exit points;
an intersection of the exit surface of the F-θ lens and the main optical axis is a central exit point;
the F-θ lens is configured to satisfy:

$$fc/fs \le 0.6, \tag{Eq. 1}$$

$$X1 - X1c > 0, \text{ and} \tag{Eq. 2}$$

$$X2 - X2c > 0; \tag{Eq. 3}$$

wherein fc is an fθ coefficient of the F-θ lens; fs is a focal length of the F-θ lens; X1 is a distance between a projection of any one of the incident points on the main optical axis and the scanning origin, X2 is a distance between a projection of any one of the exit points on the main optical axis and the scanning origin, X1c is a distance between the central incident point and the scanning origin, and X2c is a distance between the central exit point and the scanning origin;

an incident point of the incident points on the incident surface with a farthest distance from the main optical axis is an edge incident point;

the F-θ lens is further configured to satisfy 0.5≤(X1max−X1c)/(X2c−X1c)≤0.6, wherein X1max is a distance between a projection of the edge incident point on the main optical axis and the scanning origin;

an exit point of the exit points on the exit surface with a farthest distance from the main optical axis is an edge exit point; and the F-θ lens is further configured to satisfy: 0≤(X2max−X2c)/(X2c−X1c)≤0.1, wherein X2max is a distance between a projection of the edge exit point on the main optical axis and the scanning origin.

9. The apparatus according to claim 8, wherein the F-θ lens is further configured to satisfy:
other exit points between the central exit point and the edge exit point include another farthest exit point, wherein the another farthest exit point is an exit point of the exit points corresponding to a maximum value of X2.

10. The apparatus according to claim 8, wherein:
X1c=21.90 mm,
X2c=30.90 mm,
21.90 mm<X1<27.29 mm, and
30.9 mm<X2<33.24 mm.

* * * * *